(12) United States Patent
Hackman

(10) Patent No.: US 6,591,506 B2
(45) Date of Patent: Jul. 15, 2003

(54) HAND OPERATED END CUTTING SHEET METAL SHEAR

(76) Inventor: Donald J Hackman, 3499 Kirkham Rd., Columbus, OH (US) 43221

( * ) Notice: Subject to any disclaimer, the term of this patent is extended or adjusted under 35 U.S.C. 154(b) by 0 days.

(21) Appl. No.: 09/945,925

(22) Filed: Sep. 4, 2001

(65) Prior Publication Data

US 2002/0026712 A1 Mar. 7, 2002

Related U.S. Application Data

(60) Provisional application No. 60/229,999, filed on Sep. 5, 2000.

(51) Int. Cl.[7] ............................................. B26B 17/02
(52) U.S. Cl. ............................. 30/229; 30/251; 30/261; 72/326
(58) Field of Search .................... 30/178, 186, 187, 30/188, 190, 229, 250, 251, 261; 72/326

(56) References Cited

U.S. PATENT DOCUMENTS

| | | | | |
|---|---|---|---|---|
| 1,812,350 A | * | 6/1931 | Lingwood | 30/229 |
| 2,590,031 A | * | 3/1952 | Petersen | 30/251 |
| 2,595,841 A | * | 5/1952 | Glick et al. | 30/229 |
| 3,939,563 A | * | 2/1976 | Deike | 30/361 |
| 4,177,664 A | * | 12/1979 | Spors | 30/229 |
| 6,240,764 B1 | * | 6/2001 | Geurts | 30/229 |

* cited by examiner

*Primary Examiner*—Hwei-Siu Payer

(57) ABSTRACT

This invention describes a hand operated, end cutting, sheet metal shear that makes cuts perpendicular to the axis of the tool handle. The shearing surfaces consist of a moving shear blade with a fixed rake angle and shear angle, cutting along a blunt anvil. The shear blade is pivotally mounted to the tool body and actuated by a toggle linkage and a movable handle. A stroke adjustment screw is incorporated into the fixed handle. The blade passes along the fixed anvil in response to squeezing the handles. The blade is angled so that the shearing action takes place sequentially along the anvil edge. The end cutting sheet metal tool is used to produce cuts at an angle to cuts made with sheet metal cutting tools.

7 Claims, 3 Drawing Sheets

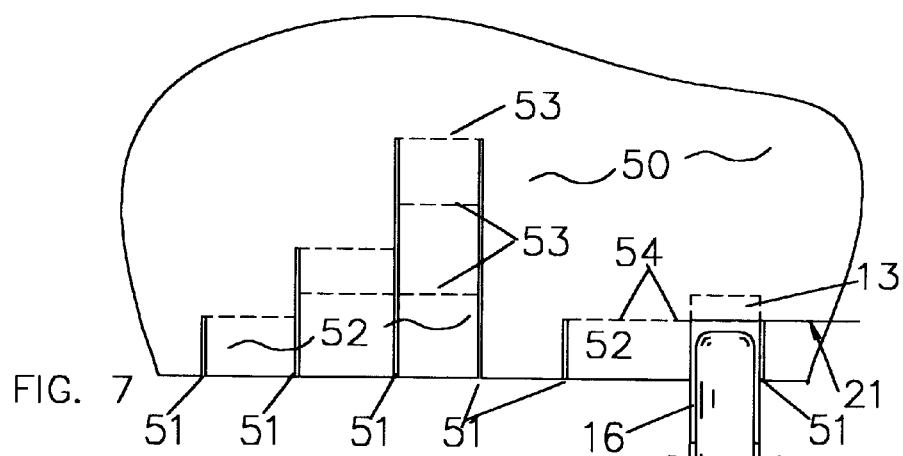
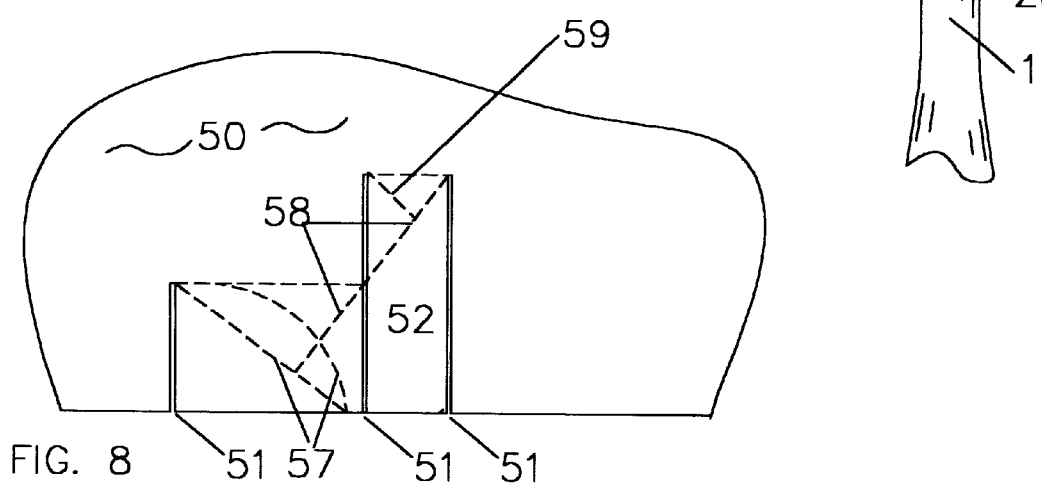
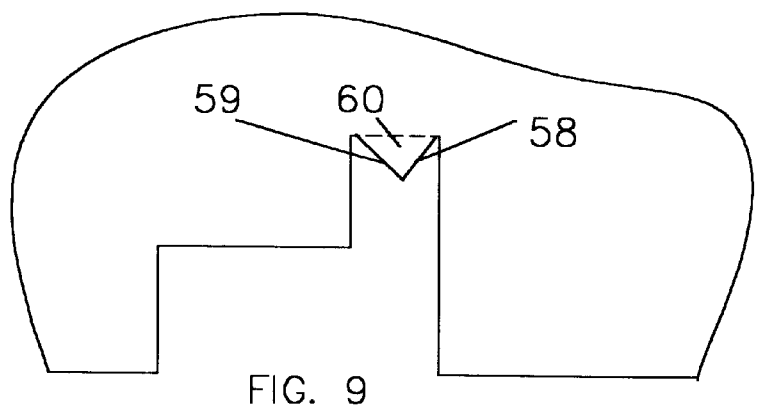

HAND OPERATED END CUTTING SHEET METAL SHEAR

CROSS-REFERENCE TO RELATED APPLICATIONS

This patent application is based upon Provisional Patent Application Serial No. 60/229,999 filed on Sep. 5, 2000.

BACKGROUND OF THE INVENTION AND PRIOR ART

In the sheet metal working industries it is often necessary to produce notches in sheet metal with right angle cuts and other sharp inside corners. Many of these applications require other irregular cut configurations that do not extend the entire width of the sheet. Steel, Stainless steel, aluminum, and copper are commonly available in sheets. Other metals and non-metals are used in relatively thin gauges that can be cut with conventional metal scissors referred to as tin snips or aviation snips. Some of the uses are for heating, ventilation, and air conditioning ductworks; electronic chassis; aircraft construction and repair; automobile repair; and metal roofs, roof trim, and gutters.

Presently notches are produced by making two parallel cuts with conventional tin snips or aviation snips as shown in FIGS. 8 and 9. After the parallel cuts are completed the blind end is still intact. This blind end is roughly cut by various techniques such as making diagonal cuts 57, 58, and 59 curved toward the blind end line. Protrusion 60 remains as shown in FIG. 9 The protrusion 60 may be filed to remove the rough edges as shown in FIGS. 8 and 9, or with a hammer and chisel cutting against an anvil. Currently there is no sheet metal shear tool on the market that can make these end cuts. This inventor has collected hundreds of hand-operated pliers and cutters for 30 years and has reviewed, patents, old tool catalogs, tool books, and has visited many museums and tool collections for 30 years. I have not seen evidence of a sheet metal end shear tool with the capabilities of the Hand operated end cutting sheet metal shear of this patent.

There are three categories of tools that produce cuts at an angle to straight-line snip cuts. They are nibblers, nippers, and notchers. Each of these categories is described below with example patents.

Nibblers

Nibblers are cutters that are used mainly in the electronic fabrication and repair business. They have a blade that is generally a small rectangular bar with cutting edges on three sides and sufficiently small to pass through a small hole. They are used to produce rectangular openings from round holes. They are light duty tools that creates or enlarges opening by cutting and removing small chips approximately 1/16 inch long by 1/4 inch wide chips. These chips do remove a portion of material. Because of these tools small size and their simple lever ratios they are not capable of producing the high forces required for making thick or wide cuts. The blade rod moves linearly in a slot with clearance to allow sliding. This clearance reduces the accuracy of the cut and allows slivers of metal, which can bind the cutting bar, or produce rough cuts and burrs. These nibblers leave debris and require considerable time in producing large notches, and their construction and their linkage precludes cutting heavy gage material or from making larger cuts. They differ from the end shear of this patent in that they cannot make continuous single cuts and they cannot cut to either side because of the non cutting portion of the blade bar. Examples of nibbling tools:

U.S. Pat. No. 2,542,103 Adel discloses the tool may be held in one hand to make a margin in a piece of sheet material by cutting away chips from the periphery of the opening.

U.S. Pat. No. 4,173,070, Vistain, discloses the cutter element has a shank portion which is arranged for reciprocation through an aperture formed in the flange portion of the cutter support. The shank portion is relieved to provide an upper cutting edge and a lower angular edge parallel to it which acts as a guide for discharging chips.

U.S. Pat. No. 2,598,287, Murphy discloses a means for cutting out rectangular and other areas in sheet metal when the edge is not accessible or when the area to be cut does not start from the edge of the sheet. It is capable of cutting out a given area in a metal sheet piece by piece until the entire area is open.

Nippers

Nippers are cutting tools with cutting edges parallel to the axis of rotation of the blades; as opposed to parallel to the handles in diagonal cutters. The blades are aligned so that they abut, producing a pinch cut rather than a shear cut. They are used to cut soft wires by pinching the material. Nippers have been used for hundreds of years for removing horseshoes and trimming horse hooves, in preparation for shoeing. They cannot be used on sheet metals because the ductility allows the material to be pinched and thinned but not fractured. These devices cannot generate high forces because of the simple lever ratios. They can cut weak or brittle materials and narrow items such as screws, nails, wire, and protrusions. The nippers may also be used for trimming tree branches, other brush, and trimming the flash and excess plastic from molded plastic parts. Examples of nipping tools are:

U.S. Pat. No. 5,987,752 Swanstrum, Jr discloses a nipper tool which is used to shape and trim a horses hoof to the shape necessary to attach a shoe. The two nipper blades are opposed blades and they abut to pinch the work object. The "V" shaped portions act as wedges to compress the material to allow the blades to abut each other. The nippers may also be used for trimming tree branches, other brush, and trimming the flash and excess plastic from molded plastic parts.

U.S. Pat. No. 2,202,340, Faist, discloses a device is adapted for use in cutting off the ends of screws, rivets, dowel pins, or mounting eye glasses.

U.S. Pat. No. 532,509, Whiting discloses cutting nippers with adjustable blades and a stop device to limit the closing movement of the blades in accordance with their adjustment and to prevent the blades from closing injuriously upon each other.

U.S. Pat. No. 5,107,559 O"Reilley discloses a device used as a pry and nail puller. The jaws are inserted beneath the shoe and the handles are squeezed to pry the shoe loose.

U.S. Pat. No. 562,746 discloses a tool that is intended for use in constructing and tearing down fences, and for pulling nails and staples.

Notchers

Notchers are a class of sheet metal tools which cut on three sides like nibblers and remove a width of material, but they are generally used to cut a notch in an edge of sheet metal to form a specific shaped cutout. They are limited in the depth of notch cut because of the tool body is wider than the width of cut. Examples of notchers are:

U.S. Pat. No. 5,483,746 discloses a slot-forming tool that has dual cutting edges and an elongated nose portion having a mechanically advantaged dual edged cutting blade which is pivotly mounted over a dual slotted anvil.

U.S. Pat. No. 2,224,226 Jensen Discloses a tool for enabling "V" shaped notches to be cut along the edge of a piece of sheet metal. It has two pivoted cross-levers.

U.S. Pat. No. 4,753,011 Long discloses a cutter with two semi-elliptical sides with dual cutting edges.

U.S. Pat. No. 5,033,194 Long discloses an upper cutter that slides in a raceway and is forced downward through a work piece into the lower cutter shearing out a segment of the workpiece.

U.S. Pat. No. 1,812,350 Lingwood discloses a through slotted jaw carried by one arm forming an anvil, a cutting jaw which at each cutting operation removes a portion of the sheet metal.

SUMMARY OF THE INVENTION

The device is shaped and operates similar to conventional locking pliers. The device has a shear anvil and a shear blade at the tool end opposite the handle. The cutting action is perpendicular to the tool handle, rather than parallel to the handle such as snips or scissors type cutters have. The present invention includes a device and a method of cutting, notching or slotting pieces of sheet metal stock. It can be used where removal of a slot-shaped cutout is desired. The hand-operated, end-cutting tool may be conveniently carried to the job site and used to produce end cuts that cannot be made with metal snips. This tool has been reduced to practice and has reliably produced hundreds of end shear cuts.

BRIEF DESCRIPTION OF THE FIGURES

FIG. 7 is a top view of a sheet metal layout and the method for series and parallel cuts by the shear tool described in this patent. This view also shows a top view of the shear tool and the method of positioning the anvil to the layout lines. The moving blade is shown in hidden lines in its position underneath the sheet.

FIG. 8. Shows the method of producing an irregular cut using a device of the previous art.

FIG. 9. Shows the protrusion that can not be removed with snips.

DETAILED DESCRIPTION OF THE INVENTION

It is understood that words such as "lower", "end", "side", "front", "top" and "back" do not imply specific direction or placement, but are used only for convenience to describe the device. It is also understood that "fixed" and "rigid" are relative terms not implying zero measurable motion, but much less motion relative to the adjoining component. For simplification the hand operated, end cutting, sheet metal shear is described as a device, a tool, and a shear. It is shown in one of many conceivable embodiments. That is not to imply that this is the only embodiment within which the device can be configured. The components may be fabricated from metal, preferably hardened alloy steel.

The Device

Figure 1:
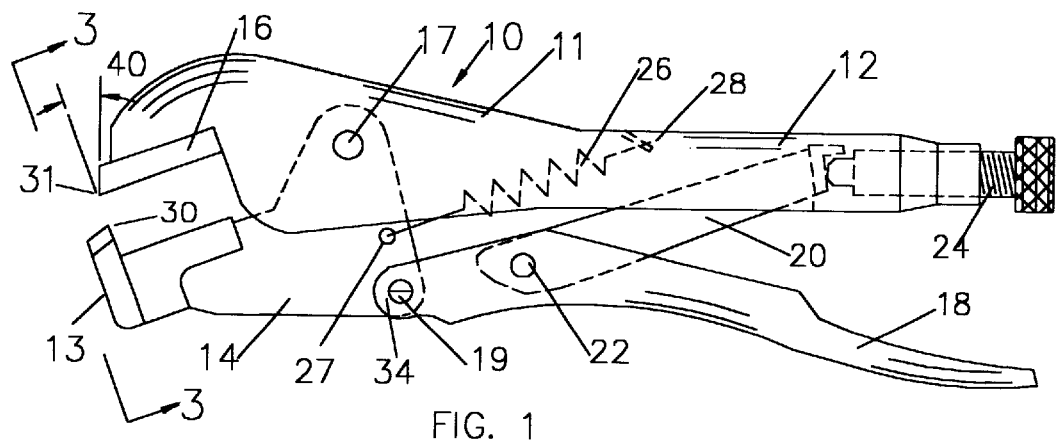
FIG. 1 is a side view of the hand operated end cutting sheet metal shear showing the relationship of major components of the device.
Figure 2:
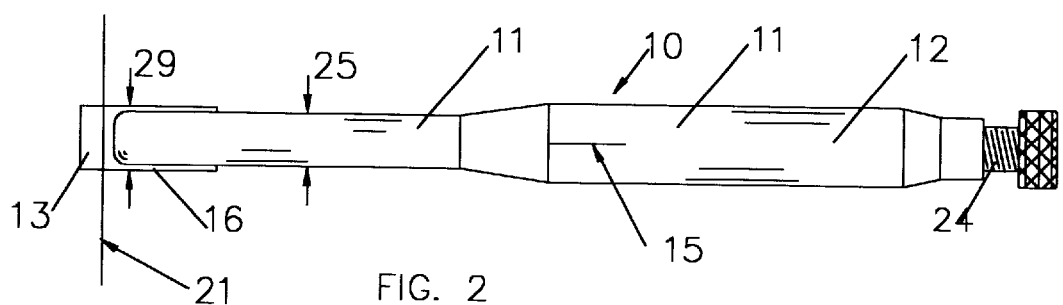
FIG. 2 is a top view of the hand operated end cutting sheet metal shear tool showing the shear line and the shear blade width compared to the tool body width.

The device is shown in FIG. 1 and FIG. 2. The end shear tool is generally designated by the reference numeral 10, and includes a body 11 with a handle 12 at one end of the body, and an anvil 16 at the other end. In addition the blade arm 14 is pivotally attached to the device body 11 with axle 17. The shear blade 13 is attached to one end of the rotating blade arm 14. The other end contains three holes; one for the rotating axle 17, a second hole for the blade actuating pin 19, and a third hole 27 to attach one end of the return extension coil spring 26. The second end of the return spring is attached to a hook 28 stamped in the main body 11.

The device 10 is shaped like and operates similar to conventional locking pliers. It can be used to remove slot-shaped cutouts, notches, or blind ends in sheet metal as shown in FIG. 7. The cutting action line 21 is perpendicular to the tool handle 12 axis 15, rather than parallel to the handle such as on snips or scissors type cutters. The hand-operated, end-cutting tool may be conveniently carried to the job site and used to produce end cuts 53 that cannot be made with metal snips.

The forward end of the lever 18 is forked to straddle the moving blade arm 14. A portion of the rotating blade arm 14 is captured between the fork tines 34 of lever 18 and is pivotally attached to the rotating blade arm 14 by pin 19. Similarly, the body 11 is preferably channel-shaped, and axle 17. The cutting blade 13 is not guided by nor supported by the anvil 16. The blade arm 14, the pivot axle 17, the body 11, and the anvil 16 are sufficiently rigid to maintain the clearance gap or the amount of overlap of the blade 13 with respect to the anvil 16. The entire width 29 of the cutting blade 13 and of the anvil 16 are wider than the body 11 width 25 allowing it to make long cuts with no open ends.

The Toggle Mechanism

FIG, 1 shows that the moving blade arm 14 is rotated on a hardened axle pin 17 and forced closed by the toggle mechanism. The toggle mechanism consists of a short link incorporated into the moving handle 18 with one pin 19 pivotally attached to the moving arm 14, and another pin 22, pivotally attached to the long compression link 20. The other end (shown in hidden lines) of the toggle link 20 is engaged with the handle 12, and abuts against the adjustment screw 24, which is threadably engaged in the end of the handle 12.

Squeezing the hand lever 18 toward the fixed handle 12 actuates the toggle mechanism. This movement forces the pinned end of the toggle long compression link 20 to rotate inwardly toward the handle 12. The pivot pin 22 also moves inwardly aligning the toggle long compression link 20 and the short link between pin 19 and pin 22 within the movable handle 18. This moves pin 19 toward the blade, causing the blade arm 14 to rotate and move the blade 13 toward anvil 16.

The toggle force is nearly parallel to the body 11 such that the force transmitted gets greater as the angle between the lever pins and the long compression link becomes smaller. The force rotates the blade arm 14 to force the blade 13 into the sheet metal. The blade force available increases as the angle between the short link and the long compression link 20 decrease.

The Cutting Blade

Figure 4:
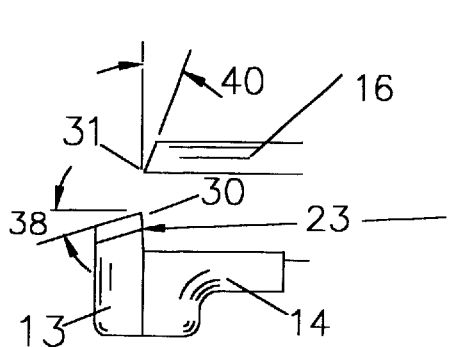
FIG. 4 is an enlarged side view showing the blade back rake angle and the anvil clearance angle.
Figure 3:
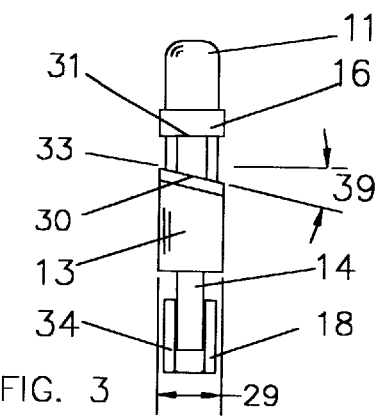
FIG. 3 is a front view detail of the cutting blade showing the blade shear angle.

FIG. 3 shows a front view and FIG. 4 shows a side view of the cutting blade and the end shear tool. The anvil 16 and the blade 13 are fabricated from alloy steel and are heat treated to provide hardened cutting edges and surfaces. The shearing surfaces consist of a moving fixed angle blade 13 shearing against a blunt anvil 16. The shear blade has a positive shear angle 39 and a positive back rake angle 38. The shear blade 13 is mounted to or integral with a moving arm 14 rotating on axle 17. The blade has a radius 23 machined on the shear surface to maintain a constant clearance with the anvil edge 31. For small angles during the actual cut the toggle moves the lever-blade pin 19 substantially parallel to the body axis 15. This axial motion acting through the rotation of the moving blade arm 14 converts the motion to a rotary motion of the blade 13 generally perpendicular to the axis of the handle 12. The cutting area is defined by the cutting blade and anvil widths 29. To reduce the amount of force, the blade has a shear angle 39 allowing the shearing action to travel continuously along the anvil edge 31 and a back rake angle 38 which tends to produce a slicing action rather than a shearing action. These angles provide a lower force and a cleaner cut along the blind end of a cutout section of the sheet metal.

Figure 5:
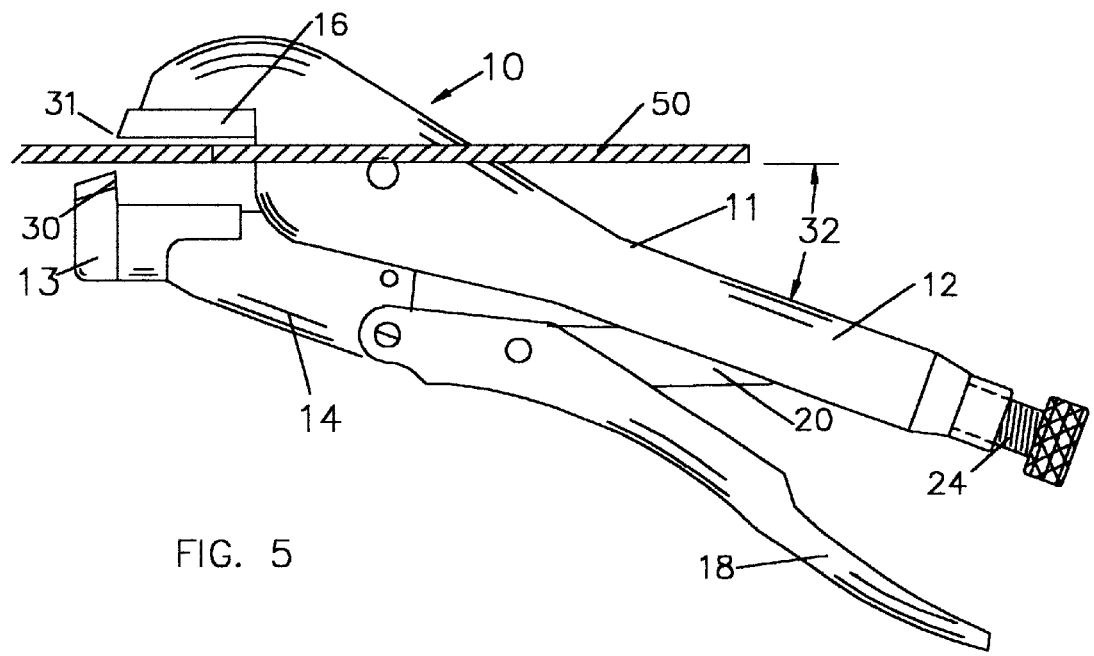
FIG. 5 shows a side view of the device in position to make a cut. It also shows the handle angle and clearance, allowing the operator to continue the cut beyond the edge of the sheet.
Figure 6:
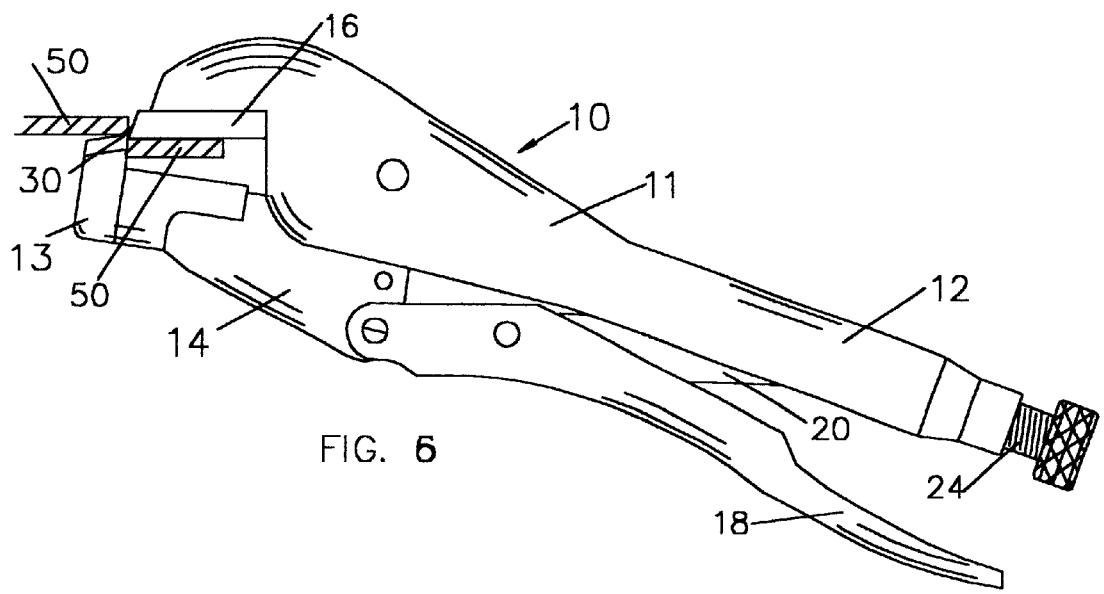
FIG. 6. shows a side view of the positional relationship of the blade to the anvil and the relationship of the movable lever to the handle after a shear cut has been made.

There is a small clearance gap between the moving shear blade edge 30 and the anvil edge 31. The shear blade does not contact the anvil 16 at any time. When the lever 18 is squeezed the blade tip 33 first contacts the sheet metal. The cutting blade edge 30 cooperates with the anvil edge 31. When the handles are pressed further, point 33 pierces the sheet and the sharpened edge 30 progressively contacts and shears the sheet material 50 while the anvil 16 supports the metal so that a smooth shear edge is formed. FIG. 5 shows the orientation of the handle 18 and the orientation of the blade cutting edge 30 relative to the anvil cutting edge 31 before shearing the workpiece 50. FIG. 6 shows the orientation of the handle 18 and the orientation of the blade cutting edge 30 relative to the anvil cutting edge 31 after shearing the workpiece 50.

The Anvil

The anvil 16 is permanently attached to the end of the body 11 opposite the handle 12 end. The anvil 16 is blunt, with no shear angle and no back rake angle, however it does have a clearance angle 40 in FIG. 4 and a small clearance gap between the moving shear blade 13 and the anvil edge 31. The anvil is stiff and rigidly attached to the body to maintain the clearance gap. The shear blade 13 does not contact the anvil 16 at any time during use of the end shear tool. When the lever 18 is squeezed the anvil 16 backs up the workpiece 50 so that a smooth edge is formed. The cutting width is defined by the cutting blade and anvil widths 29 in FIG. 2. To assure a complete cut at the edges of the snip cut, the blade 13 is the same width as the anvil 16. To reduce the amount of force on the anvil 16, the blade 13 has a shear angle 39 allowing the shearing action to travel continuously along the anvil 16 and a back rake angle 38 for producing shearing action to travel continuously along the anvil 16 and a back rake angle 38 for producing a slicing action rather than a shearing action. When the lever is squeezed the blade tip 33 first contacts the sheet metal. When the lever 18 is pressed further, point 33 forces the sheet material against the shear anvil.

The Workpiece

FIG. 7 shows a sheet metal layout 50 for using the device of this invention to cut notches 52 in workpiece 50. First the side cuts 51 are made with conventional snips. End cuts 53 and 54 are made when the lever 18 is squeezed, causing the shear blade 13 to pierce the sheet and progressively shear the sheet material 50 against anvil 16. FIGS. 5 and 6 show the position of the end cutters in relation to the workpiece before and after shearing. The end cutter is predominately used for cutting thin unhardened material including steel, stainless steel, aluminum, and copper. The end shear tool may also be used to cut other metals and non-metals. This device can shear any metal that can be cut with tin or aviation snips. As an example an end shear tool 10 inches long can cut mild steel from 18 gauge (0.050 inches) to 38 gauge (0.005 inches) and stainless steel from 22 gauge (0.030 inches) to 38 gauge (0.005 inches). The cutting action line 21 is perpendicular to the tool handle 12, rather than parallel to the handle such as on snips or scissors type cutters. The hand-operated, end-cutting tool may be conveniently carried to the job site and used to produce end cuts that cannot be made with metal snips. The minimum notch width is limited to the blade and anvil width 29. There is no maximum width or length size limit to the notch that can be cut with the end shear of the present invention.

To reduce the amount of force on the workpiece, the blade has a shear angle 39 allowing the shearing action to travel through the workpiece continuously along the anvil 16. The blade has a back rake angle 38 producing a slicing action rather than a shearing action on the workpiece. These angles not only provide a lower force, but they leave a smaller burr along the blind end of a cutout section of the sheet. When the lever 18 is squeezed the anvil blade tip 33 first contacts the workpiece 50 at a snip cut 51. When the handles are pressed further, point 33 pierces the sheet and the sharpened edge 30 progressively contacts and shears the sheet material from one snip cut 51 to another while the anvil backs up the metal for a smooth edge. Since the blade 13 and the anvil 16 are wider 29 than the tool body 25, cuts can be made to any width equal to or greater than the width of the cutting blade width.

The Method

In preparation for a cut, the end shear tool 10 is held by tool handle 12 and lever 18 with the layout lines on the workpiece 50 and the shear anvil 16 facing the operator as shown in FIG. 5 and FIG. 7. The tool 10 is positioned so the sheet metal stock 50 is between the cutting edges of the shearing blade 30 and the shearing edge of the anvil edge 31. The tool 10 is inserted over the sheet metal 50 so the anvil cutting edge 31 is aligned with the layout line as shown in FIG. 7. If the cut position is longer than the shear tool throat, a series of cuts 53 can be made to reach the blind end of the cutout. Since the blade 13 and the anvil 16 are wider than the tool body 25, cuts can be made to any width equal to or greater than the width 29 of the cutting blade. Squeezing the handle 12 and the lever 18 operates the end cutting sheet metal tool 10. The shear tool blade 13 and anvil 16 are angled 32 with respect to the handle 12 so the operator's hand is below the sheet 50. Therefore, end shears cuts may be made beyond the handle length. If the metal is thick or the operators hand squeeze is limited, the cut may be made by merely releasing the lever slightly and backing off the adjusting screw 24, then resume squeezing the lever 18. This can be repeated as many times as required to complete the cut by advancing the adjustment screw after each squeeze stroke.

I claim:

1. A hand operated end cutting sheet metal shear comprising:

(a) body, having front and rear portions, a longitudinal axis, and a fixed handle at the said rear portion of said body, said fixed handle is concentric with the said longitudinal axis and has internal threads at the end of said rear portion;

(b) a fixed anvil blade, secured to the said front portion of said body, said fixed anvil blade with a shearing edge, said shearing edge positioned at the front end of said fixed anvil blade and perpendicular to the said body longitudinal axis, said anvil blade has no shear angle and no rake angle, but it does have a small clearance angle at the front end;

(c) a movable arm pivotably connected to the said body front portion on an axle that is perpendicular to the said body longitudinal axis, wherein a shear blade is affixed to the front end of said movable arm, said shear blade with a shearing edge cooperating with the front end of the said anvil blade, so that the said shearing edge passes by the said anvil blade edge to create a shearing action between the said shear blade and the said anvil blade, said movable arm containing, an arm hole for said axle, a lever arm hole for a lever-arm pin, and a spring attachment hole;

(d) a lever formed into a U shaped channel and pivotally connected, at the front end thereof to said movable arm by the said lever-arm pin at the said lever-arm hole, said movable arm is captured within the said U shaped channel, said lever containing a lever-link hole, said lever-link hole positioned away from said lever-arm pin, said lever having a gripping surface at the rear end of said lever;

(e) a compression link having first and second ends, said compression link pivotally connected, at the said first end, by said lever-link pin at the said lever-link hole, said second end of said compression link engaging an abutting means within the said body;

(f) a toggle linkage made up of the said compression link, and a forward link, said forward link is a portion of the front part of the said lever encompassing the area of the said lever-arm hole and the said lever-link hole, said toggle linkage operates to rotate said movable arm, which actuates said shear blade, said toggle linkage providing a mechanical advantage shearing force to the said shear blade shearing edge in response to a force produced by squeezing together said fixed handle and said lever.

2. The hand operated end cutting sheet metal shear of claim 1, wherein an adjustment screw is threaded into the said internal threads in said handle of said body and comprising an abutting surface that bears upon the said compression link, such that rotation of the said screw adjusts the position of the said toggle linkage, which in turn positions the said shear blade with respect to the said anvil blade.

3. The hand operated end cutting sheet metal shear of claim 2, wherein the said shear blade is sufficiently near the said anvil blade to allow sheet metal to be sheared cleanly.

4. The hand operated end cutting sheet metal shear of claim 2, wherein the said shear blade is held in an open position by a tension spring, said tension spring is attached to the said spring attachment hole in said movable arm with the opposite end of said tension spring attached to a hook means inside of the said body.

5. The hand operated end cutting sheet metal shear of claim 2, wherein the said shear blade has a shear angle and a rake angle to reduce the force required to shear sheet metal.

6. The hand operated end cutting sheet metal shear of claim 5, wherein the said body is narrower than the said shear blade and the said anvil blade, allowing notches to be cut to any depth by making a series of foreword cuts, between two snip cuts, and advancing the said end cutting sheet metal shear after each cut.

7. The hand operated end cutting sheet metal shear of claim 5, wherein the said shear blade is removable for replacement.

* * * * *